April 10, 1951
E. READ
2,548,061
FLEXIBLE TRAY CONVEYER
Filed Aug. 27, 1947
2 Sheets-Sheet 1
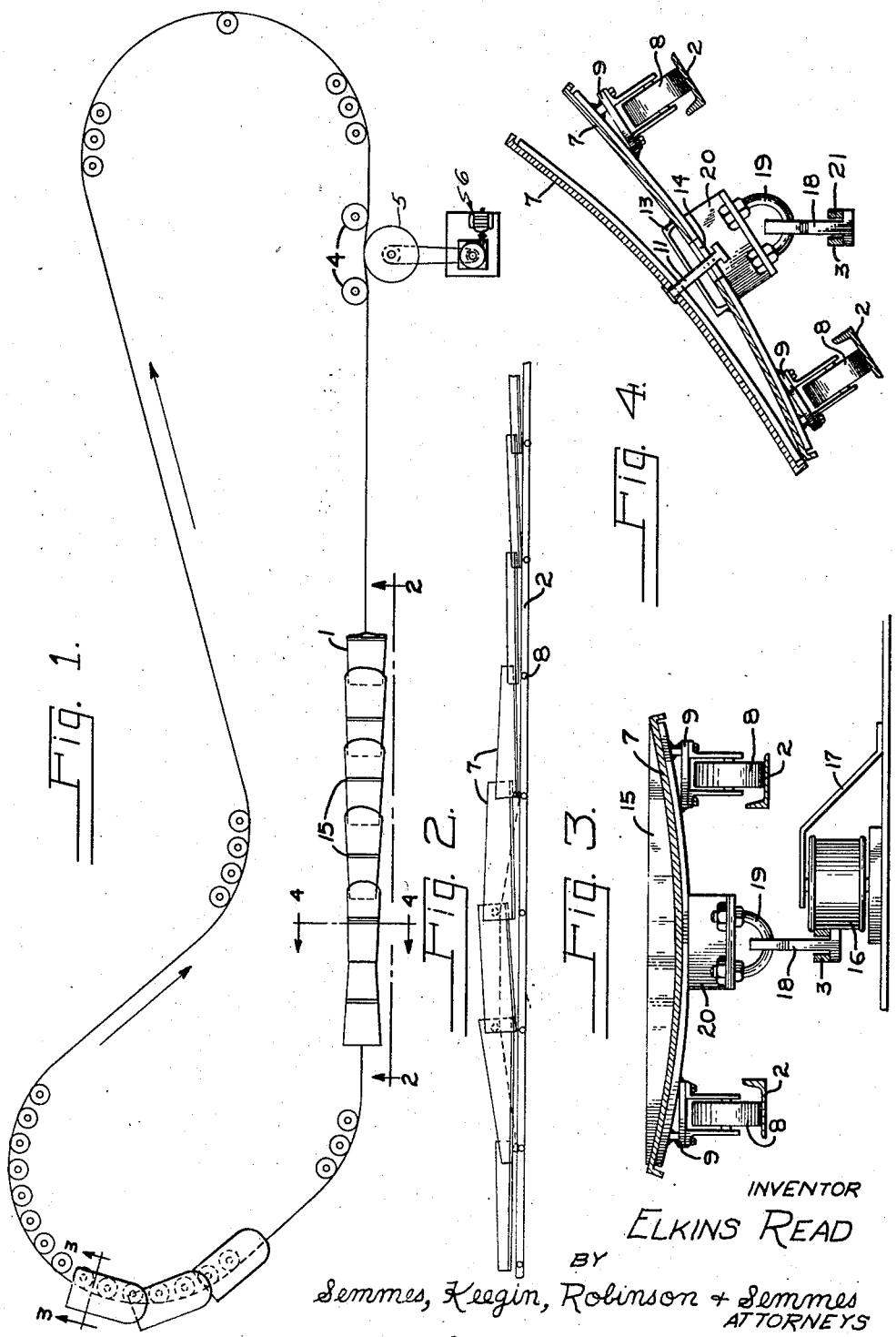
INVENTOR
ELKINS READ
BY
Semmes, Keegin, Robinson + Semmes
ATTORNEYS April 10, 1951 E. READ 2,548,061
FLEXIBLE TRAY CONVEYER
Filed Aug. 27, 1947 2 Sheets-Sheet 2
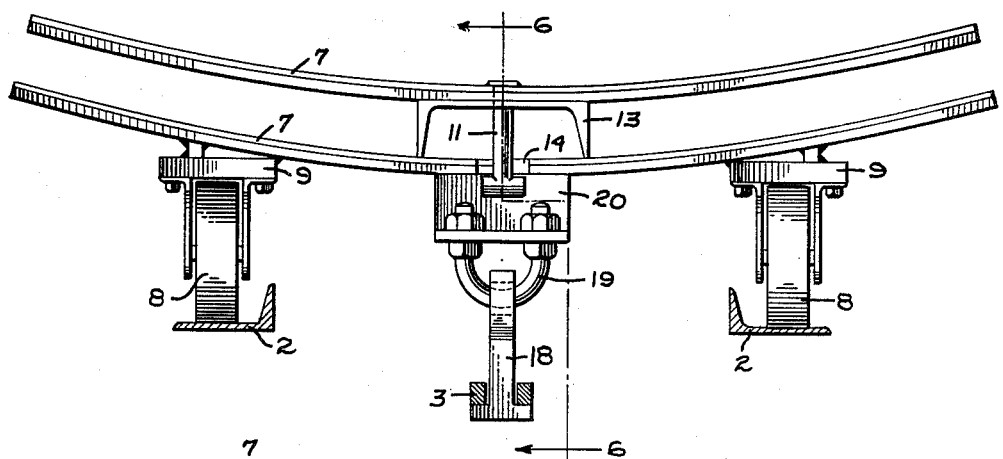
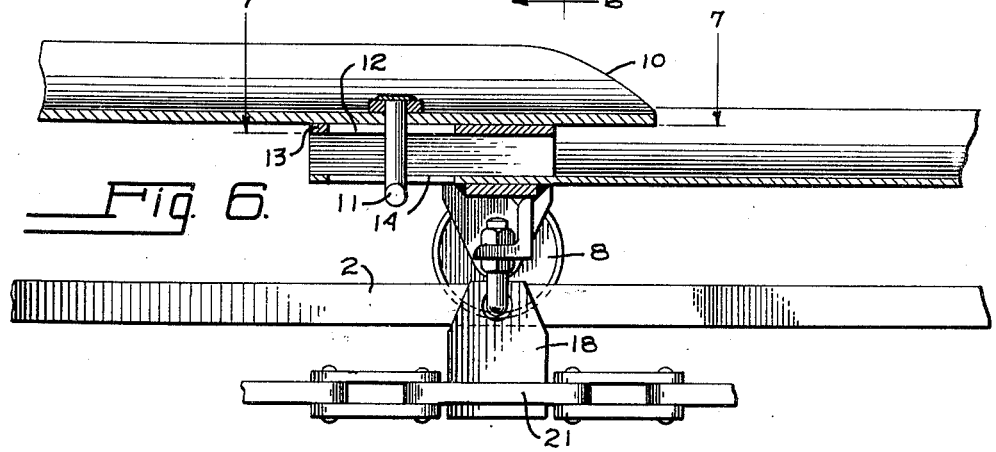
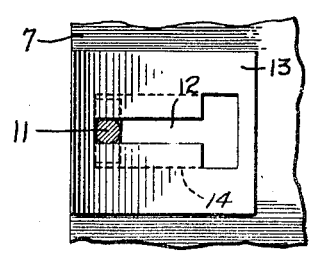
INVENTOR
ELKINS READ
BY
Semmes, Keegin, Robinson & Semmes
ATTORNEYS Patented Apr. 10, 1951

2,548,061

UNITED STATES PATENT OFFICE 2,548,061

FLEXIBLE TRAY CONVEYER

Elkins Read, Pottsville, Pa.

Application August 27, 1947, Serial No. 770,923

6 Claims. (Cl. 198—181)

This invention relates to endless conveyors, and more especially to an extremely flexible device of this type for use under difficult conditions, such as are encountered in transporting large quantities of loose bulk material, such as ore and coal from the working face to the surface of mines, including quarries, collieries, and the like. This application is a continuation in part of my copending application, Serial Number 647,337, filed February 13, 1946 and now abandoned.

In order to transport material from such places the conveyor, which is usually mounted on a track, passes through the airway level and returns loaded to the surface through the parallel gangway level. This arrangement requires sharp curves at corresponding ends of both levels, in order to form a continuous conveyor and, the section joining the curves within the mine must be the full pitch of the vein.

Moreover some veins, especially anthracite veins, are never regular in direction or grade so that the conveyor loop must weave in and out, and must accommodate itself to sudden changes from flat grades to grades having at times as much as a 40 degree incline. In order to successfully operate under these conditions the sections of the conveyor must be sufficiently flexible to follow these curves and grades without binding or other interference with each other.

One of the objects of the present invention is to provide a device for transporting bulk material from a mine or the like, which will be sufficiently flexible to operate successfully under the conditions encountered in this type of transportation.

Another object of the present invention is to provide a device for this purpose which is formed of a series of sections which are mounted on rails and are actuated by a chain passing around a series of sheaves positioned at the curves of the track.

A further object of the present invention is to provide a device of the character described which is provided with flexible means to join the individual sections forming the conveyor and with other flexible means to attach the individual sections to the chain so as to provide an extremely flexible conveyor which is able to negotiate the curves and sudden changes in grade without the sections binding or interfering with each other.

With these and other objects in view which may be incident to my improvements, the invention consists in the parts and combinations hereinafter set forth and claimed with the understanding that the necessary elements comprising the invention and the procedural steps of its operation may be varied by those skilled in the art without departing from the spirit of the invention or the scope of the appended claims.

Broadly the invention comprises providing an endless conveyor for transporting loose bulk material. The conveyor is formed of a series of overlapping sections which are mounted on a pair of rails and are connected together in an extremely flexible manner. Each section is also flexibly attached to the power driven chain.

These features provide a conveyor which has sufficient flexibility to negotiate sharp curves and steep grades, such as are frequently encountered in removing ore or coal from mines. It also permits one of the rails forming a section of the track to be higher than the other, so as to laterally incline the conveyor at that section for automatic dumping of the transported material.

In the drawings:

Figure 1 is a diagrammatic plan view of the conveyor and elevator forming the present invention.

Figure 2 is a view taken along the lines 2—2 of Figure 1 looking in the direction of the arrows.

Figure 3 is a view taken along the lines 3—3 of Figure 1 looking in the direction of the arrows.

Figure 4 is a view taken along the lines 4—4 of Figure 1 looking in the direction of the arrows.

Figure 5 is a cross sectional view of one of the sections forming the conveyor.

Figure 6 is a view taken along the lines 6—6 of Figure 5 looking in the direction of the arrows.

Figure 7 is a view taken along the lines 7—7 of Figure 6 looking in the direction of the arrows.

For purposes of illustration, there has been shown in the drawings a device embodying the present invention, especially adapted for transporting loose bulky material. This transportation medium comprises a continuous conveyor, generally indicated by the numeral 1, which is mounted on a pair of parallel rails forming a track 2. The conveyor is actuated by a driven chain 3, which passes around sheaves 4. The chain 3 is driven by a sprocket 5, which is rotated by a power unit of any suitable type 6.

As best shown in Figures 2 and 6, the conveyor 1 is composed of a series of overlapping trays 7, of concave shape, each of which is supported by a pair of wheels 8 mounted for movement on the track 2. These wheels are journaled in casters 9, a pair of which are secured to the under surface of each of the trays 7 adjacent the forward or leading end. The upper surface of the trays is slightly concave in shape to prevent the loss of the material being transported. Their rear ends, which overlap the forward end of the adjacent tray, are rounded, as shown at 10, so that in going around bends the rear end of one tray does not push material off the tray which is following.

As best shown in Figures 6 and 7, adjoining trays are connected together by a T-headed bolt 11, the shank of which is secured, such as by welding, to the overlapping tray adjacent its rear or tailing end. The bolt 11 extends downwardly below the tray and through a T-slot 12 in the web of an inverted channel piece 13 secured to the upper surface of the adjoining or overlapping tray adjacent its forward or leading end. The bolt 11 is of a substantial length to allow relative vertical displacement of the overlapping ends of adjoining trays and to provide clearance for the T-headed end of the bolt. The tray immediately below the T-slot 12 is formed with a cut-out or aperture 14 whose dimensions are at least equal to the length and width of the T-slot 12 as shown in Figure 7. This construction permits relative movement longitudinally, vertically and angularly between adjoining trays. The cut-out 14 permits a substantial length for the bolt 11 with overlap of the full width of adjoining trays.

This assembly is extremely flexible because, as shown in Figure 7, the aperture 12 in the channel member 13 through which the bolt 11 extends is in the form of a T shaped slot. This structure enables the bolt to move either laterally or longitudinally in the slot. These movements allow overlapping trays to ride up on adjoining trays or the overlap can be reduced, thereby elongating a section of the conveyor. This relative movement enables the conveyor to be extremely flexible and is of great assistance to sections when negotiating steep grades, sharp curves or passing over the dumping portion of the track 2. However, the slots 12 are positioned so as to prevent the separation of adjoining trays sufficiently to form a crack through which the transported material could escape. The provision of the aperture 14 in the overlapped tray affords additional flexibility to the conveyor when it is traveling over inclined sections of the track 2, as in passing the unloading zone. The slot 14 permits a long bolt 11 to be used and thus permits one tray to be tilted considerably relative to the succeeding tray, as when the conveyor is passing over section of track the inclination of which is changing rapidly. Each tray may also be provided with one or more transverse stiffeners 15, to prevent sliding of the transported material when the conveyor is on a steep grade.

As previously set forth, the chain 3 passes over sheaves 4. These sheaves are positioned on the inside of the curves of the track in order to provide proper alignment of the chain and rails on all sections of the track. As best shown in Figure 3, each of the sheaves 4 comprises a roller 16 mounted on a shaft which is carried by a bracket 17.

In the illustrated form of the invention, a driven chain 3 is employed. Each tray is attached to this chain by a hook 18. In order to obtain a flexible connection, the hook 18 is swingably attached to a U bolt 19, through an eye in the upper end of the hook through which the U bolt is threaded. The U bolt is in turn secured to an angle bracket 20 which is attached to the bottom portion of the tray between the wheels. As illustrated in Figures 3 and 4 the connection of the trays 7 to the chain 3 by means of the hook 18 and U bolt 19 permits the chain to remain at all times at the same inclination and to pass smoothly over the rollers 16. The U bolt 19 slides through the aperture in the hook 18 as tray 7 becomes tilted, so that the hook 18 and the chain 3 always remain at approximately the same inclination.

In order to provide additional flexibility, the chain 3 at spaced intervals, is provided with slotted links 21 through which the prong of the adjacent hook 18 extends. This arrangement allows the hook to move within the slots and thus provides for a further relative movement between the trays and the chain, which further increases the flexibility of the conveyor.

The dumping action of the track is shown in Figures 1 and 2. In this section, as best shown in Figure 4, one of the rails of the track is raised above the remaining rail, to cause the conveyor passing over this section to be laterally tilted. This causes the transported material to slide off the trays, thereby enabling it to be removed without stopping the conveyor.

This dumping action, together with the steep grades and sharp curves which have been previously mentioned, would place a severe strain upon the conveyor except for the extreme flexibility with which the trays are coupled together and attached to the power chains. Because of this flexibility, the conveyor can continuously negotiate these steep grades and sharp turns and dump the material without the sections binding or interfering with each other. As a result, the life and efficiency of the conveyor are greatly increased.

While, for purposes of illustrating the invention, only one form of the conveyor has been shown, it is obvious that the features embodying this invention could be combined with other types of conveyors, by those skilled in the art, without departing from the spirit of the invention. Moreover, while a conveyor embodying the invention is particularly useful for transporting material under unfavorable conditions, such as are encountered in mines, it is obvious it could be utilized when desirable under more favorable conditions.

I claim:

1. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, an elongated headed bolt having a shank rigidly secured to the overlapping end of each tray and extending through said slot and coupling adjoining trays together, said bolt being movable in the slot to permit restricted horizontal and vertical relative movement between the overlapped ends of adjoining trays, and driving means for the conveyor including an endless chain extending beneath said trays and having a driving connection respectively with each of the same.

2. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, an elongated headed bolt having a shank rigidly secured to the overlapping end of each tray and extending through said slot and coupling adjoining trays together, said bolt being movable in the slot to permit restricted horizontal and vertical relative movement between the overlapped ends of adjoining trays, a pair of axially spaced supporting wheels attached to the underside respectively of each tray adjacent the end thereof carrying said channel piece, a trackway comprising spaced rails upon which said wheels ride, and driving chain means for the conveyor including an endless chain extending beneath said trays and having a driving connection respectively with each of the same.

3. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, an elongated headed bolt having a shank rigidly secured to the overlapping end of each tray and extending through said slot and coupling adjoining trays together, said bolt being movable in the slot to permit restricted horizontal and vertical relative movement between the overlapped ends of adjoining trays, a pair of axially spaced supporting wheels attached to the underside respectively of each tray adjacent the end thereof carrying said channel piece, a trackway comprising spaced rails upon which said wheels ride, and driving means for the conveyor including an endless chain extending beneath said trays, and flexible connector means connecting said chain respectively to each tray substantially between said wheels.

4. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, an elongated headed bolt having a shank rigidly secured to the overlapping end of each tray and extending through said slot and coupling adjoining trays together, said bolt being movable in the slot to permit restricted horizontal and vertical relative movement between the overlapped ends of adjoining trays, a pair of axially spaced supporting wheels attached to the underside respectively of each tray adjacent the end thereof carrying said channel piece, a trackway comprising spaced rails upon which said wheels ride, a movable endless chain extending beneath said trays, a U-bolt secured to the end of each tray centrally between said wheels, and a drag member respectively connecting each U-bolt with said chain, said drag member having an eye connection with the U-bolt permitting tilting movement of the trays relatively to the plane of movement of the chain.

5. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, said end of the tray having a cut-out directly below said slot and having longitudinal and transverse dimensions at least equal to the widest dimensions of said slot, an elongated headed bolt having a shank rigidly secured respectively to the overlapping end of each tray and extending through said slot and cut-out and coupling adjacent trays together, said bolt being movable in the slot and cut-out to permit restricted relative movement between overlapped ends of adjoining trays, and driving means for the conveyor including an endless chain extending beneath said trays and having a driving connection respectively with each of the same.

6. A device for transporting material comprising a plurality of trays in end to end overlapping relation forming an endless conveyor, an inverted channel piece respectively secured to the upper surface of each tray adjacent one end thereof and on which the overlapping end of the adjoining tray normally rests, said channel piece having a longitudinally extending T-shaped slot therein, said end of the tray having a cut-out directly below said slot and having longitudinal and transverse dimensions at least equal to the widest dimensions of said slot, an elongated headed bolt having a shank rigidly secured respectively to the overlapping end of each tray and extending through said slot and cut-out and coupling adjacent trays together, said bolt being movable in the slot and cut-out to permit restricted relative movement between overlapped ends of adjoining trays, and driving means for the conveyor including an endless chain extending beneath said trays and having a driving connection respectively with each of the same.

ELKINS READ.

REFERENCES CITED

The following references are of record in the file of this patent:

UNITED STATES PATENTS

| Number | Name | Date |
| --- | --- | --- |
| 763,431 | Schmidt et al. | June 28, 1904 |
| 1,848,603 | Burpee | Mar. 8, 1932 |
| 2,219,724 | Quick | Oct. 29, 1940 |
| 2,242,811 | Bowers | May 20, 1941 |